(12) United States Patent
Creta et al.

(10) Patent No.: US 7,089,362 B2
(45) Date of Patent: Aug. 8, 2006

(54) CACHE MEMORY EVICTION POLICY FOR COMBINING WRITE TRANSACTIONS

(75) Inventors: Kenneth C. Creta, Gig Harbor, WA (US); Robert Blankenship, Tacoma, WA (US); Robert George, Austin, TX (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 10/035,034

(22) Filed: Dec. 27, 2001

(65) Prior Publication Data

US 2003/0126369 A1   Jul. 3, 2003

(51) Int. Cl.
*G06F 12/00* (2006.01)

(52) U.S. Cl. ............ 711/133; 711/135; 711/144; 711/159; 711/170

(58) Field of Classification Search ............ 711/133, 711/159, 170, 135, 144, 145
See application file for complete search history.

(56) References Cited

U.S. PATENT DOCUMENTS

| | | | |
|---|---|---|---|
| 5,561,780 A | 10/1996 | Glew et al. | |
| 6,119,205 A | 9/2000 | Wicki et al. | |
| 6,295,582 B1 | 9/2001 | Spencer | |
| 2002/0083243 A1* | 6/2002 | Van Huben et al. | 710/107 |
| 2003/0033480 A1* | 2/2003 | Jeremiassen | 711/118 |
| 2003/0084253 A1* | 5/2003 | Johnson et al. | 711/144 |
| 2003/0105929 A1* | 6/2003 | Ebner et al. | 711/144 |
| 2004/0186958 A1* | 9/2004 | Percival | 711/129 |

FOREIGN PATENT DOCUMENTS

EP   0 397 995   11/1990

OTHER PUBLICATIONS

Jim Handy, "The Cache Memory Book", Copyright 1998, Academic Presee, second edition, p. 124.*
Jim Handy, "The Cache Memory Book", Copyright 1998, Academic Press, second Edition, pp. 156-158.*
Peter G. Sassone, "Cache Consistency Protocol Comparison", Mar. 2001, pp. 2 and 4.*

* cited by examiner

*Primary Examiner*—Pierre Vital
*Assistant Examiner*—Midys Rojas
(74) *Attorney, Agent, or Firm*—Philip A. Pedigo

(57) ABSTRACT

Apparatus having a cache memory including cache lines configured to cache data sent from an input/output device and an eviction mechanism configured to evict data stored in one of the cache lines based on validity state information associated with the data stored in the one cache line. Each cache line has multiple portions, and validity bits are used to track the validity of respective portions of the cache line. The validity bits are set to predefined values responsive to the number of bytes written into the respective portions in one write transaction. The cache line is evicted by the eviction mechanism when the validity bits corresponding to the cache line all have the predefined values. The eviction mechanism is configured to evict the data even if the cache memory is not full.

22 Claims, 2 Drawing Sheets

CACHE MEMORY EVICTION POLICY FOR COMBINING WRITE TRANSACTIONS

TECHNICAL FIELD

This invention relates to cache memory eviction.

BACKGROUND

Cache memory is a small block of high-speed memory that is typically placed between a data processing unit and a slower main memory. When the processing unit needs to access data stored in the main memory, it first looks to the cache memory to see whether the data is available in the cache. When the processing unit first reads data from the main memory, a copy of that data is stored in the cache as part of a block of information (known as a cache line) that represents consecutive locations of main memory. When the processing unit writes data to the main memory, the data is stored in the cache. When the processing unit subsequently access memory addresses that have been accessed previously or nearby addresses, the processing unit first checks the cache memory rather than the main memory. This approach reduces average memory access time because, when data is accessed at an address in the main memory, later accesses will likely involve data from within the same block (this is the temporal locality principle). The data written into cache memory remains there until certain conditions are met (e.g., the cache memory is full), then a cache line is selected according to a specified criterion (e.g., the one least recently used) and is evicted.

Data caching is typically not done when input/output (I/O) devices write data to main memory because it is unlikely that another transaction will involve the same address as the data previously written by I/O devices. Therefore, a computer chipset that manages data transfers to and from I/O devices typically forwards the write data directly to main memory without caching the data.

DETAILED DESCRIPTION

Figure 1:
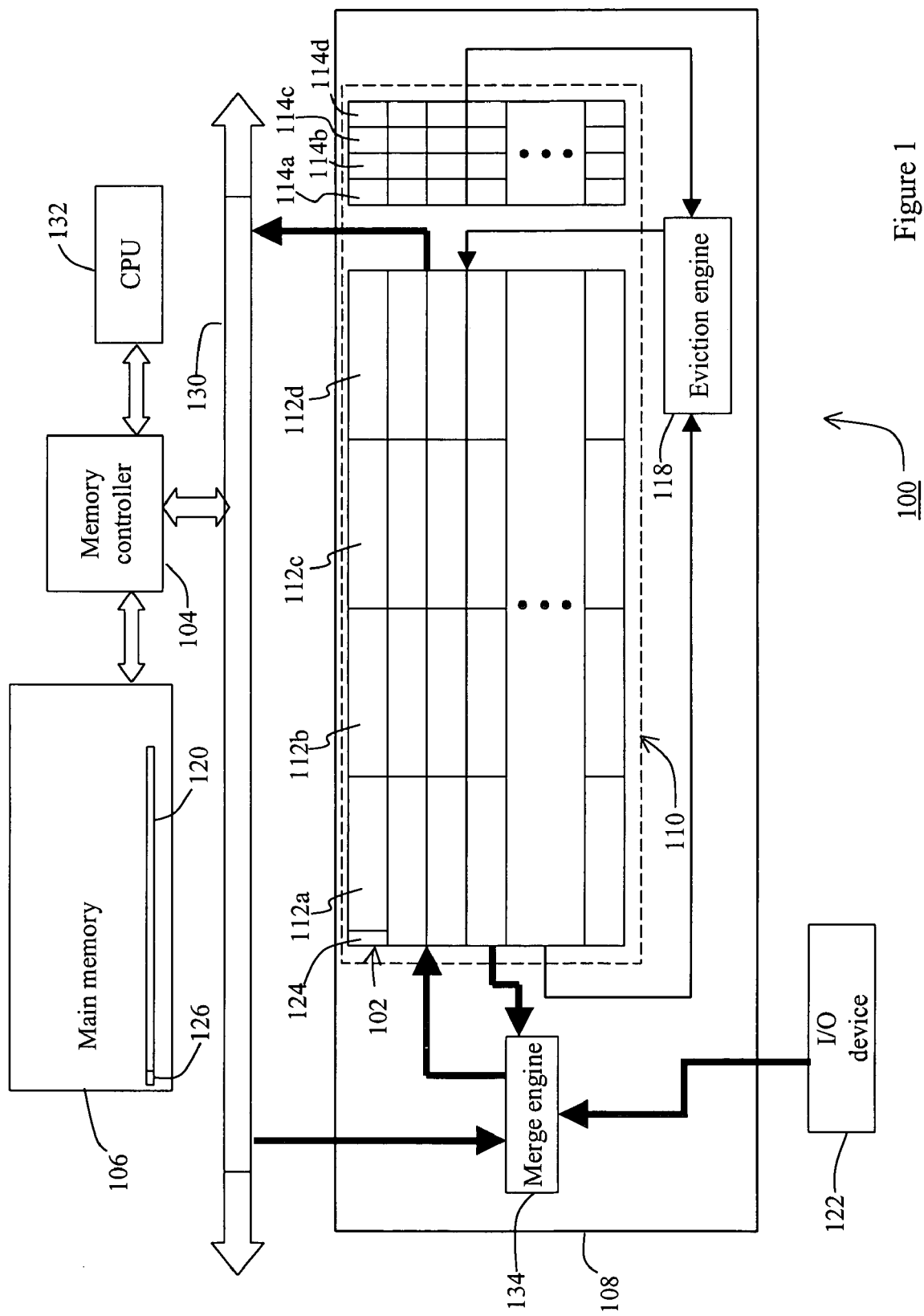
FIG. 1 is a schematic circuit diagram.

Referring to FIG. 1, a computer system 100 includes an I/O device 122 that issues write transactions to write data to a main memory 106. The data is first sent to a cache line 102 that is configured to store, for example, 128 bytes of data corresponding to 128 consecutive addresses in the main memory 106. Four validity bits 114a, 114b, 114c, and 114d are used to track four 32-byte portions of cache line 102, referred to as storage blocks 112a, 112b, 112c, and 112d, respectively. Initially, the validity bits are set to "0". When a 32-byte aligned data is written into a storage block, the corresponding validity bit is set to "1". When the four validity bits that correspond to the four storage blocks in a cache line are all set to "1", an eviction engine 118 evicts the 128 bytes of data stored in the cache line by transferring the data to an interface bus 130 and clearing the cache line. The four validity bits are then set to "0". The evicted bytes of data are forwarded to a memory controller 104 that writes the bytes of data into main memory 106. An advantage of using validity bits is that when I/O device 122 writes data in units that are less than 128 bytes, it is possible to combine the data written in different write transactions and evict a cache line only after it is full, reducing the number of eviction operations and enhancing system efficiency.

Cache line 102 is one line of a write cache 110 that is part of an I/O hub 108 that manages transactions relating to I/O devices. Write cache 110 has, for example, thirty-one other cache lines, each of which can store 128 bytes of data, just like cache line 102. Each of the cache lines in write cache 110 has four associated validity bits, with each validity bit tracking a 32-byte storage block of the cache line. When bytes of data are written into the cache lines, each cache line reflects an address 126 where the first byte 124 of data in cache line 102 is stored in main memory 106. Address 126 is referred to as the "cache line address." All of the bytes of data in cache line 102 are stored within a 128-byte segment 120 in main memory 106. In the description below, bytes of data are said to "correspond to the same cache line address" when those bytes of data are stored within a 128-byte segment of main memory 106 starting from that particular cache line address. The bytes of data that correspond to one write transaction are together referred to as a "write data unit."

When I/O device 122 writes a new write data unit to write cache 110, I/O hub 108 determines whether the new write data unit and a cache line in write cache 110 corresponds to the same cache line address. This will occur when a write data unit previously written into a cache line and the new write data unit have addresses that fall within the same 128-byte segment in main memory 106. I/O hub 108 then merges the new write data unit with the cache line by overwriting portions of the cache line with the new write data unit.

If I/O hub 108 determines that the new write data unit does not correspond to the cache line address of any of the cache lines in write cache 110, I/O hub 108 reads a 128-byte segment of data from main memory 106. Portions of the 128-byte segment will have the same addresses as the data in the new write data unit. A merge engine 134 merges the 128-byte segment with the new write data unit by overwriting portions of the 128-byte segment with the new write data unit. The modified 128-byte segment is then written into a cache line in write cache 110.

Data stored in a cache line is evicted and transferred to interface bus 130 when either of the following two conditions are met. The first condition is that a new write data unit sent from I/O device 122 does not correspond to any cache line address of the data currently stored in write cache 110 and the cache is full (or if the percentage of cache lines having data is above a certain threshold, e.g., 80%). Because all of the data within a cache line correspond to 128 consecutive addresses in main memory 106, the new write data cannot be written into any of the cache lines without removing some of the data bytes already stored there. Then, a cache line is selected according to an eviction algorithm, and 128 bytes of data in the selected cache line are evicted by eviction engine 118 onto interface bus 130. An example of the eviction algorithm is the least recently used (LRU) eviction algorithm.

The second condition that triggers eviction of data bytes in a cache line is when the four validity bits that correspond to the four storage blocks of a cache line are all set to "1". This condition indicates that the cache line is full. Because it is unlikely that the write data sent from I/O device 122 will be used by other devices without another agent (e.g., a processor) modifying it first, there is little value to keep the data bytes in write cache 110 any longer. Thus, when eviction engine 118 detects that the four validity bits corresponding to a cache line are all set to "1", eviction engine 118 evicts the data bytes in that cache line onto interface bus 130.

The advantage of using validity bits to track portions of the cache lines is significant when I/O device 122 issues write transactions with write data units that are shorter than the cache lines. For example, I/O device 122 may be configured to issue 32-byte write transactions so that when I/O device 122 writes a sequential 128 bytes of data to main memory 106, I/O device 122 issues four 32-byte write transactions. This may occur when I/O hub 108 is implemented under a newer platform with larger cache line sizes but still needs to be compatible with existing Peripheral Component Interface (PCI) cards designed for smaller cache line sizes.

Without using validity bits to track portions of cache lines, each time a 32-byte write transaction is issued by I/O device 122, I/O hub 108 would have to read a 128-byte segment from main memory 106, merge the 128-byte segment with the 32 byte write data and write the merged 128-byte segment into a cache line, and then evict the cache line. Thus, when I/O device 122 writes a sequential 128 bytes of data to main memory 106, I/O hub 108 will have to read 128-byte segments from main memory 106 four times, perform the merge operation four times, and evict the cache line four times. By using the validity bits to track portions of cache lines, I/O hub 108 has to read a 128 byte segment from main memory 106 only once, merge the 32-byte write data units into the cache line four times, then evict the cache line only once.

The improved efficiency is significant when interface bus 130 is a coherent interface that is coupled to additional cache memories. A coherent interface is an interface that follows a cache coherent protocol, such as the MEI (modified-exclusive-invalid) or MESI (modified-exclusive-shared-invalid) protocols. Because write cache 110 is coupled to interface bus 130, write cache 110 must also follow the cache coherent protocol. When I/O hub 108 receives write data from I/O device 122 and writes to a cache line, I/O hub 108 must first invalidate that cache line in other cache memories (place in the invalid state), assert ownership of the cache line (place in the exclusive state), then subsequently modify the cache line with the write data, and place the cache line in the modified state. Without the use of validity bits, in order for I/O device 122 to write 128 bytes of data to main memory 106, four separate invalidate and four separate eviction operations are required. By using the validity bits, only one invalidate and one eviction operations are required to write the 128 bytes of data.

Moreover, use of the validity bits allows cache lines that are written in full to be evicted faster than just by using the LRU eviction algorithm. This is particular significant for write data initiated by I/O devices because I/O devices typically write to large contiguous blocks in main memory 106.

Figure 2:
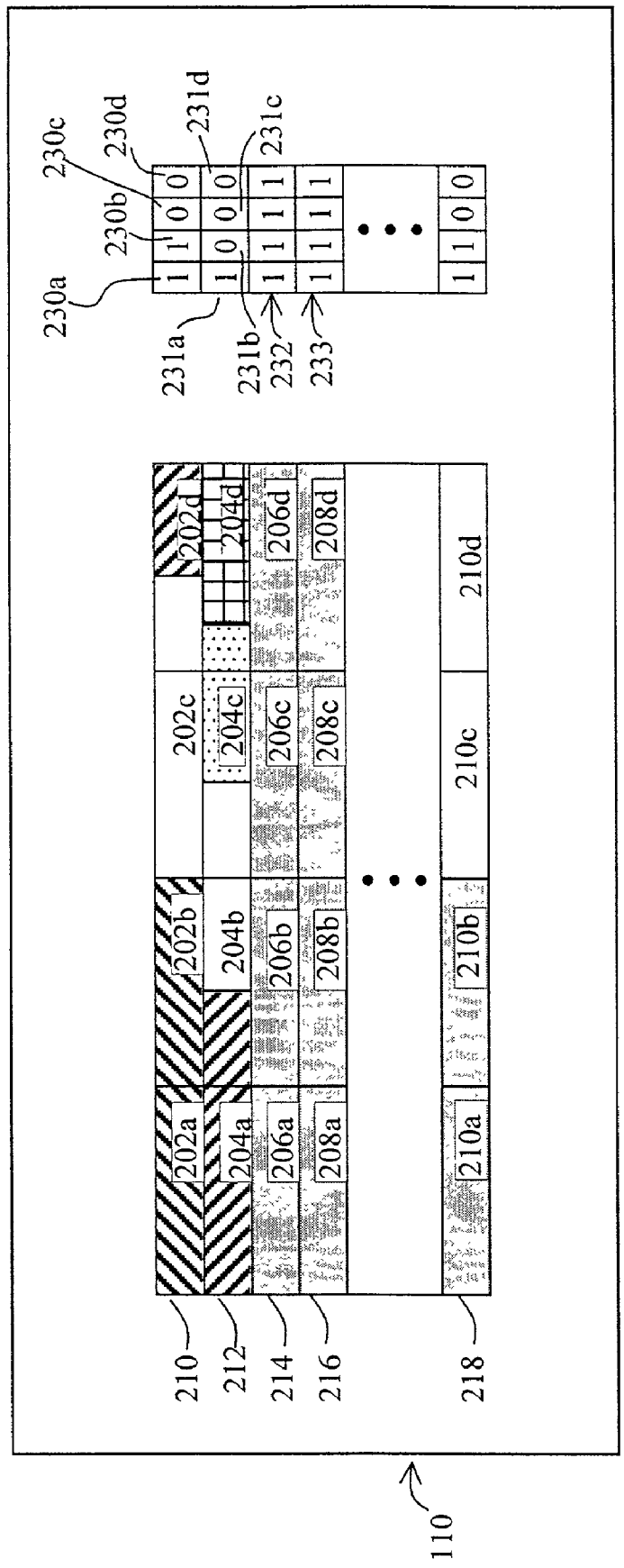
FIG. 2 is a schematic diagram.

FIG. 2 shows examples of validity bit settings with respect to data stored in write cache 110. Initially, all validity bits are set to "0". A 64-byte write data unit is written into storage blocks 202a and 202b. Validity bits 230a and 230b are set to "1" because the corresponding storage blocks are written in full in one transaction. Next, a 64-byte write data unit is written into part of storage block 202d, the entire storage block 204a, and part of storage block 204b. Validity bit 231a is set to "1", but validity bits 230d and 231b remain "0" because the corresponding storage blocks are not written in full in one transaction. Next, a 48-byte write data unit is written into part of storage blocks 204c and 204d. Then another 48-byte data is written into part of storage block 204d. Although storage block 204d is written in full after the two 48-byte write transactions, validity bit 231d remains "0" because it was not set to "1" during the two 48-byte write transaction. In the examples given above, the validity bits corresponding to cache lines 210 and 212 are not all set to "1", therefore those cache lines will be evicted based on the eviction algorithm, such as the LRU eviction algorithm.

As another example, a 256-byte write data unit is written into storage blocks 206a, 206b, 206c, 206d, 208a, 208b, 208c, and 208d. Because 32-byte data units are written into these storage blocks, the validity bits 232 and validity bits 233 corresponding to these storage blocks are set to "1". Eviction engine 118 monitors the status of the validity bits in each cache line. As soon as the validity bits 232 are all set to "1", eviction engine 118 evicts cache line 214. As soon as the validity bits 233 are all set to "1", eviction engine 118 evicts cache line 216. In this example, the cache lines that are fully written into do not have to wait for the eviction algorithm to determine the time of eviction. This results in more efficient use of write cache 110 as well as other components that are used to process the data stored in write 110, such as interfaces 130, memory controller 104, main memory 106, and CPU 132.

An advantage of evicting a cache line when the validity bits are all set to "1" is that the LRU algorithm will be used more efficiently. For example, assume that validity bits are not used and that write cache 110 is full. Assume that a cache line 218 is the least recently used cache line with storage blocks 210a and 210b written in full. Assume that I/O device 122 sends a write data unit that does not correspond to any cache line address of the data currently stored in write cache 110. I/O device 122 then sends a 64-byte write data unit that corresponds to addresses consecutive to the addresses of data stored in blocks 218a and 218b. The LRU algorithm will select cache line 218 to be evicted before the write cache receives the 64-byte write data unit. The 64-byte write data unit will have to be evicted in another eviction transaction. If validity bits are used and that a cache line is evicted when the validity bits are all set to "1", cache lines 214 and 216 will be evicted earlier than cache line 218. Write cache 110 will not be full when it receives the 64-byte write data unit. The 64-byte write data unit will be written into storage blocks 210c and 210d, and only one eviction transaction will be required to evict the data stored in storage blocks 210a, 210b, 210c, and 210d.

It is possible to design write cache 110 so that a validity bit tracks a smaller or a larger portion of a cache line. For example, a validity bit can be configured to track 8-byte portions of a cache line. Under such configuration, sixteen validity bits would be required to track the sixteen 8-byte portions (storage blocks) of a 128-byte cache line. In another design, a validity bit can be configured to track 64-byte portions of a cache line. In this case, two validity bits would be required to track the two 64-byte portions of a 128-byte cache line.

The write cache can be designed to have two modes. In one mode, the write cache operates in the same way described previously. The cache line is evicted when all four validity bits corresponding to a cache line are set to "1". In the other mode, the write cache is configured to implement 64-byte cache lines. The eviction engine is configured to evict a cache line when the two validity bits corresponding to the first two storage blocks of the cache line are set to "1". In this way, a cache line is evicted as soon as 64 bytes of data are written into the first half of a 128-byte cache line.

Other embodiments are within the scope of the following claims. For example, the write cache may be a general purpose cache that is used to store both write data and read data. The write cache can have any number of cache lines, and the cache lines can be of any size. Validity bits can be configured to track any size of storage blocks in a cache line. A cache line that is least recently used may be evicted when a certain percentage, e.g., 80%, of the cache lines in the write cache have been written into rather than wait for the entire write cache to be full. The I/O hub can be configured to receive data from more than one I/O device. Interface bus 130 can be any type of coherent interface bus. The I/O device may be a keyboard, a mouse, a sound card, a video card, a digital scanner, a digital camera, a network card, a modem, or any other type of device that writes data to main memory. Computer system 100 may be any data processing system, including multiprocessor systems.

What is claimed is:

1. Apparatus comprising:
   a cache memory comprising cache lines to store data, each of at least a subset of the cache lines having multiple portions, each portion corresponding to a validity bit that is set to a predefined value when the corresponding portion of the cache line is fully written with new data in one write transaction, at least some of the data to be written to a main memory; and
   an eviction mechanism to evict data stored in one of the cache lines upon detecting validity bits indicating that respective portions of the cache line have been written with new write data that were not read from the main memory, the eviction mechanism to send the evicted data to the main memory.

2. The apparatus of claim 1 in which each of the cache lines is to store data that corresponds to consecutive addresses in the main memory.

3. The apparatus of claim 1, further comprising a storage to store validity bits that track the validity of respective portions of the cache line.

4. The apparatus of claim 3 in which the validity bits are set to a predefined value to indicate that the respective portion has been written in full in one write transaction.

5. The apparatus of claim 4 in which the eviction mechanism is to evict the cache line when the validity bits all have the predefined value.

6. The apparatus of claim 1 in which the eviction mechanism is to evict the data even if the cache is not full and data in other cache lines is not being evicted at the same time.

7. The apparatus of claim 1, further comprising the main memory to store the data evicted by the eviction mechanism.

8. The apparatus of claim 7 in which the data are generated by an input/output device and are stored in the cache memory before being written to the main memory.

9. The apparatus of claim 1 in which the cache memory complies with a cache coherent protocol.

10. The method of claim 1 in which every cache line in the cache memory has multiple portions.

11. Apparatus comprising:
    cache lines, each to store bytes of data that correspond to consecutive addresses in a main memory, at least some of the data to be written to the main memory, each of at least a subset of the cache lines having multiple portions, each portion corresponding to a validity bit that is set to a predefined value when the corresponding portion of the cache line is fully written with new data in one write transaction the validity bit not being set to the predefined value if the corresponding portion of the cache line is not fully written with new data or if the corresponding portion of the cache line is fully written with new data in two or more write transactions; and
    an eviction component to evict the bytes of data stored in one of the cache lines when validity bits corresponding to the multiple portions of a cache line are all set to the predefined value, the eviction component to send the evicted data to the main memory.

12. The apparatus of claim 11 in which cache lines are disposed within a write cache memory of a computer chipset.

13. The apparatus of claim 11 in which the cache memory complies with a cache coherent protocol.

14. The apparatus of claim 13 in which the cache coherent protocol comprises at least one of a modified-exclusive-invalid (MEI) protocol and modified-exclusive-shared-invalid (MESI) protocol.

15. A method comprising:
    receiving write transactions associated with write data to be written to a main memory;
    storing the write data into portions of a single cache line of a cache memory, the cache line having multiples portions, each portion corresponding to a validity bit that is set to a predefined value when the corresponding portion of the cache line is fully written with new data in one write transaction; and
    evicting the write data from the cache line upon detecting validity bits indicating that respective portions of the cache line have been written with new write data that were not read from the main memory.

16. The method of claim 15, further comprising writing the evicted bytes of data to the main memory.

17. The method of claim 15, further comprising setting validity bits to a predefined value when respective portions of the cache line is written in full with write data.

18. The method of claim 15 in which the write transactions are sent from an input/output device.

19. The method of claim 18 in which each of the write transactions sent from the input/output device writes a first number of data bytes to one of the cache lines, and the eviction component evicts a second number of data bytes in one eviction operation, the first number being less than the second number.

20. The method of claim 15 in which the cache memory complies with a cache coherent protocol.

21. The method of claim 15, further comprising reading a segment of data from the main memory if the write data to be written to the main memory do not correspond to a cache line address of the cache line, a portion of the segment of data having the same addresses as the data to be written to the main memory.

22. An apparatus comprising:
    a cache memory comprising cache lines to stored data sent from an input device, the data being stored in the cache memory before being written to a main memory, each of at least a subset of the cache lines having multiple portions, each portion corresponding to a validity bit that is set to a predefined value when the corresponding portion of the cache line is fully written with new data in one write transaction, the validity bit not being set to the predefined value if the corresponding portion of the cache line is not fully written with new data or if the corresponding portion of the cache line is fully written with new data in two or more write transactions; and
    an eviction mechanism to evict data stored in one of the cache lines upon detecting validity bits indicating that respective portions of the cache line have been written with new write data that were not read from the main memory.

* * * * *